United States Patent
Sasaki

(10) Patent No.: US 7,990,808 B2
(45) Date of Patent: Aug. 2, 2011

(54) PERFORMING ERROR-FREE ACCESS OPERATION ON MULTI-LAYERED DISC

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1167 days.

(21) Appl. No.: 11/663,509

(22) PCT Filed: Oct. 14, 2005

(86) PCT No.: PCT/JP2005/019350
§ 371 (c)(1),
(2), (4) Date: Mar. 22, 2007

(87) PCT Pub. No.: WO2006/043648
PCT Pub. Date: Apr. 27, 2006

(65) Prior Publication Data
US 2008/0144455 A1    Jun. 19, 2008

(30) Foreign Application Priority Data
Oct. 18, 2004 (JP) .................... 2004-302568

(51) Int. Cl.
*G11B 5/09* (2006.01)
(52) U.S. Cl. ............ 369/30.01; 369/94; 369/275.3
(58) Field of Classification Search .......... 369/30.03, 369/275.1–275.4, 44.28, 53.23, 30.01
See application file for complete search history.

(56) References Cited

U.S. PATENT DOCUMENTS

| 6,711,106 B2 | 3/2004 | Sasaki | |
|---|---|---|---|
| 6,918,003 B2 | 7/2005 | Sasaki | |
| 2002/0114245 A1 | 8/2002 | Sasaki | |
| 2002/0159353 A1 | 10/2002 | Sasaki | |
| 2003/0033475 A1 | 2/2003 | Sasaki | |
| 2003/0133369 A1 | 7/2003 | Sasaki | |
| 2003/0223338 A1 | 12/2003 | Sasaki | |
| 2004/0057366 A1 | 3/2004 | Sasaki | |
| 2004/0076084 A1* | 4/2004 | Yonezawa | 369/30.1 |
| 2004/0090886 A1 | 5/2004 | Sasaki | |
| 2004/0165499 A1 | 8/2004 | Sasaki | |
| 2005/0030852 A1 | 2/2005 | Sasaki | |
| 2005/0201224 A1* | 9/2005 | Lee | 369/44.28 |
| 2005/0207304 A1* | 9/2005 | Murotani | 369/53.23 |

FOREIGN PATENT DOCUMENTS

| JP | 08-282675 | 10/1997 |
|---|---|---|
| JP | 2002-008252 | 1/2002 |
| JP | 2004-288308 | 10/2004 |
| JP | 2005-267704 | 9/2005 |
| WO | WO 2006/043648 A1 | 4/2006 |

* cited by examiner

*Primary Examiner* — William J Klimowicz
*Assistant Examiner* — Andrew J Sasinowski
(74) *Attorney, Agent, or Firm* — Dickstein Shapiro LLP

(57) ABSTRACT

A method of reproducing information recorded on an optical disc having a plurality of recording layers inclusive of a first recording layer and a second recording layer includes the steps of referring to an order of recording of the first recording layer and the second recording layer according to which information is recorded in a prerecorded area of the optical disc, and selecting a scan path in response to the order of recording, from a first scan path including no seek operation preceding a focus jump and a second scan path including a seek operation preceding a focus jump, to scan an optical spot from a first address in the first recording layer to a second address in the second recording layer through scanning along the prerecorded area in at least one of the first recording layer and the second recording layer.

21 Claims, 11 Drawing Sheets

PERFORMING ERROR-FREE ACCESS OPERATION ON MULTI-LAYERED DISC

TECHNICAL FIELD

The present invention generally related to reproduction methods, optical disc apparatuses, programs, and record media, and particularly relates to a method of reproducing information recorded on an optical disc having a plurality of recording layers, an optical disc apparatus operable to reproduce information recorded on an optical disc having a plurality of recording layers, a program for use in such an optical disc apparatus, and a recording medium having such a program recorded thereon.

BACKGROUND ART

With a recent development of digital technology and improvement in data compression technology, optical discs such as DVDs (digital versatile discs) have been attracting attention as information recording media for storing computer programs, music information, and video information (hereinafter also referred to as "contents"). As the price of such optical discs drops, optical disc apparatuses for reproducing information recorded on the optical discs are now becoming widely used.

The amount of content information tends to increase year by year, which leads to an expectation for a further increase in the storage capacity of optical disks. As a means to increase the storage capacity of an optical disk, extensive efforts are being made with respect to the development of optical disks having a plurality of recording layers and also with respect to the development of optical disc apparatuses for accessing such optical disks.

As a read-only optical disk having two recording layers, a DVD-ROM having two recording layers on one side thereof (hereinafter referred to as "single-side two-layer DVD-ROM") has been put into practical use. With this single-side two-layer DVD-ROM, a laser beam is shone from one side, and the focus of the optical beam is placed on the individual layers to perform reproduction separately for each recording layer. This thus allows the information recorded on each recording layer to be reproduced without flipping over the disc. Further, as an optical disc having two recording layers capable of storing information, a DVD-R having two recording layers on one side thereof (hereinafter referred to as "single-side two-layer DVD-R") is known. With this single-side two-layer DVD-R, it is possible to record information on each recording layer and reproduce information recorded on each recording layer without flipping over the disc. In the following, an optical disc having two recording layers (referred to as LAYER-0 and LAYER-1) on one side thereof will be referred to as a single-side two-layer disc.

In information reproducing apparatuses adapted to the single-side two-layer disc, one of the two scan paths (scan path A and scan path B) is employed as a scan path when scanning an optical spot from an address (current address) on one recording layer (referred to as X) to an address (target address) on the other recording layer (referred to as Y). In the scan path A, the focus is jumped from the recording layer X to the recording layer Y at the current address position, followed by performing a seek operation toward the target address on the recording layer Y. In the scan path B, an address on the recording layer X at the same position as the target address in terms of the disc radial direction is set as a tentative target address, and a seek operation is performed from the current address to the tentative target address, followed by jumping the focus at the tentative target address position from the recording layer X to the recording layer Y (see Patent Document 1, for example). In general, the scan path A is easier than the scan path B in terms of achieving high-speed scan, and is thus employed in many information reproducing apparatuses adapted to the single-side two-layer disc. Further, there are apparatuses that perform focus jump and seek operation at the same time (see Patent Document 2, for example).

As shown in FIG. 12A, all the data area of a layer LAYER-0 is a prerecorded area, and a portion (on the inner circumference side) of the data area of a layer LAYER-1 is an unrecorded area. In such a single-side two-layer disc (e.g., a single-side two-layer DVD+R prior to finalizing), an optical spot may be scanned from an address a (current address) on the inner circumference side of the layer LAYER-0 to an address b (target address) in the prerecorded area of the layer LAYER-1. In such a case, focus jump is performed at the position of the address a to the layer LAYER-1 as shown in FIG. 12B when the scan path A is employed. In this example, the layer LAYER-1 has an unrecorded area at the same position as the address a in the disc radial direction, so that address information included in reproduced data cannot be acquired. There is thus a risk of failing to perform a proper focus jump.

When the optical spot is scanned from the address b (current address) to the address a (target address) as shown in FIG. 12C, a tentative target address a' is set, followed by performing a seek operation to the tentative target address a' on the layer LAYER-1 when the scan path B is employed. In this case, however, the tentative target address a' is situated in the unrecorded area. There may thus be a risk of suffering a seek error without being able to acquire address information contained in reproduced data.

As described above, when an unrecorded area is coexistent with a prerecorded area, an information reproducing apparatus adapted to a single-side two-layer disc may fail to reproduce information recorded on a target address even though the target address is situated in the prerecorded area.

[Patent Document 1] Japanese Patent Application Publication No. 9-282675

[Patent Document 2] Japanese Patent Application Publication No. 2002-8252

Accordingly, there is a need for a reproduction method and optical disc apparatus that can properly reproduce information in a stable manner from an optical disc having a plurality of recording layers in which a prerecorded area and an unrecorded area are coexistent.

There is another need for a program performed by the control-purpose computer of an optical disc apparatus and a recording medium having such a program embodied therein which can reproduce information in a stable manner from an optical disc having a plurality of recording layers in which a prerecorded area and an unrecorded area are coexistent.

DISCLOSURE OF INVENTION

It is a general object of the present invention to provide a scheme for reproducing information from an optical disc that substantially obviates one or more problems caused by the limitations and disadvantages of the related art.

It is another and more specific object of the present invention to provide a scheme for reproducing information from an optical disc that can properly reproduce information in a stable manner from an optical disc having a plurality of recording layers in which a prerecorded area and an unrecorded area are coexistent.

To achieve these and other advantages in accordance with the purpose of the invention, the invention provides a method of reproducing information recorded on an optical disc having a plurality of recording layers inclusive of a first recording layer and a second recording layer, which includes the steps of referring to an order of recording of the first recording layer and the second recording layer according to which information is recorded in a prerecorded area of the optical disc, and selecting a scan path in response to the order of recording, from a first scan path including no seek operation preceding a focus jump and a second scan path including a seek operation preceding a focus jump, to scan an optical spot from a first address in the first recording layer to a second address in the second recording layer through scanning along the prerecorded area in at least one of the first recording layer and the second recording layer, the second address being a target address where reproduction is to be performed.

With this provision, it is possible to scan the optical spot from the first address to the second address along the prerecorded area in at least one of the first recording layer and the second recording layer, so that address information necessary for the scan can be obtained properly with sufficient accuracy along the way as the scan is performed. That is, information is reproduced properly in a stable manner from an optical disc having a plurality of recording layers in which a prerecorded area and an unrecorded area are coexistent.

According to another aspect of the present invention, an optical disc apparatus for reproducing information recorded on an optical disc having a plurality of recording layers inclusive of a first recording layer and a second recording layer includes an optical pickup unit configured to form an optical spot on a recording layer selected from the plurality of recording layers and to detect light reflected from the selected recording layer, a control unit configured to control said optical pickup unit such that an order of recording of the first recording layer and the second recording layer according to which information is recorded in a prerecorded area of the optical disc is referred to, and that a scan path is selected in response to the order of recording, from a first scan path including no seek operation preceding a focus jump and a second scan path including a seek operation preceding a focus jump, to scan the optical spot from a first address in the first recording layer to a second address in the second recording layer through scanning along the prerecorded area in at least one of the first recording layer and the second recording layer, the second address being a target address where reproduction is to be performed, and a processing unit configured to reproduce information by use of a signal output from said optical pickup unit.

With this provision, it is possible to scan the optical spot from the first address to the second address along the prerecorded area in at least one of the first recording layer and the second recording layer, so that the control unit can obtain proper address information necessary for the scan with sufficient accuracy along the way as the scan is performed. Consequently, the optical spot is accurately formed at the second address, so that the processing unit can reproduce information properly by use of the signal output from the optical pickup unit. That is, information is reproduced properly in a stable manner from an optical disc having a plurality of recording layers in which a prerecorded area and an unrecorded area are coexistent.

According to another aspect of the present invention, a program for causing a control-purpose computer in an optical disc apparatus to reproduce information recorded on an optical disc having a plurality of recording layers inclusive of a first recording layer and a second recording layer includes the program codes to cause the control-purpose computer to perform the steps of referring to an order of recording of the first recording layer and the second recording layer according to which information is recorded in a prerecorded area of the optical disc, and selecting a scan path in response to the order of recording, from a first scan path including no seek operation preceding a focus jump and a second scan path including a seek operation preceding a focus jump, to scan an optical spot from a first address in the first recording layer to a second address in the second recording layer through scanning along the prerecorded area in at least one of the first recording layer and the second recording layer, the second address being a target address where reproduction is to be performed.

With this provision, as the program of the present invention is loaded to memory, with its start address being set to a program counter, the control-purpose computer of the optical disc apparatus controls the scan operation such as to scan the optical spot from the first address to the second address along the prerecorded area in at least one of the first recording layer and the second recording layer, so that address information necessary for the scan can be obtained properly with sufficient accuracy along the way as the scan is performed. That is, information is reproduced properly in a stable manner from an optical disc having a plurality of recording layers in which a prerecorded area and an unrecorded area are coexistent.

According to another aspect of the present invention, a computer-readable record medium has a program embodied therein for causing a control-purpose computer in an optical disc apparatus to reproduce information recorded on an optical disc having a plurality of recording layers inclusive of a first recording layer and a second recording layer, the program including program codes to cause the control-purpose computer to perform the steps of referring to an order of recording of the first recording layer and the second recording layer according to which information is recorded in a prerecorded area of the optical disc, and selecting a scan path in response to the order of recording, from a first scan path including no seek operation preceding a focus jump and a second scan path including a seek operation preceding a focus jump, to scan an optical spot from a first address in the first recording layer to a second address in the second recording layer through scanning along the prerecorded area in at least one of the first recording layer and the second recording layer, the second address being a target address where reproduction is to be performed.

With this provision, it is possible to scan the optical spot from the first address to the second address along the prerecorded area in at least one of the first recording layer and the second recording layer, so that address information necessary for the scan can be obtained properly with sufficient accuracy along the way as the scan is performed. That is, information is reproduced properly in a stable manner from an optical disc having a plurality of recording layers in which a prerecorded area and an unrecorded area are coexistent.

BEST MODE FOR CARRYING OUT THE INVENTION

Figure 1:
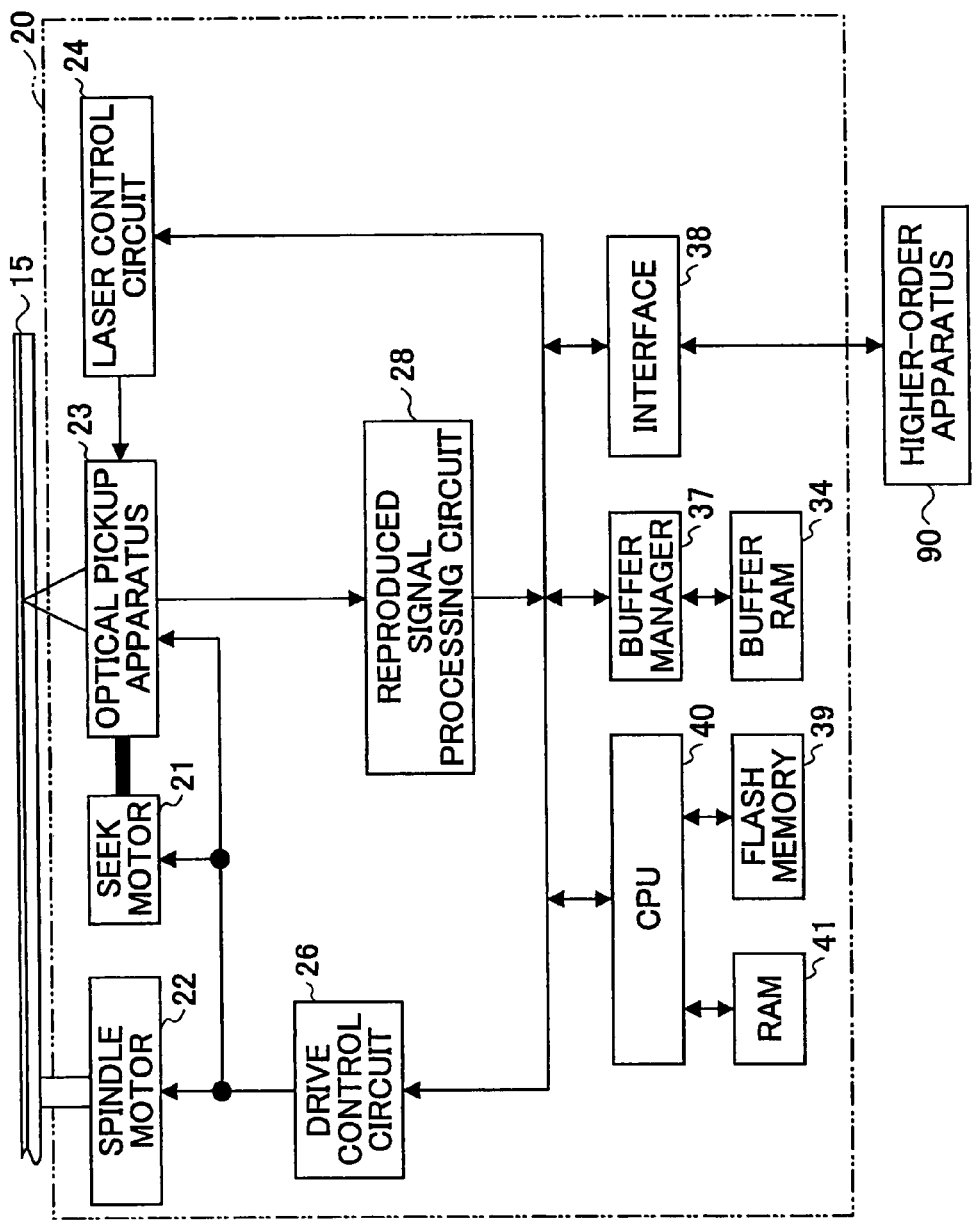
FIG. 1 is a drawing showing a schematic configuration of an optical disc apparatus according to the embodiment of the present invention.

In the following, an embodiment of the present invention will be described with reference FIG. 1 through FIG. 8B. FIG. 1 is a drawing showing a schematic configuration of an optical disc apparatus 20 according to the embodiment of the present invention.

The optical disc apparatus 20 shown in FIG. 1 includes a spindle motor 22 for revolving an optical disc 15 having a plurality of recording layers on which a track or tracks are formed in a spiral form or concentric manner, an optical pickup apparatus 23, a seek motor 21, a laser control circuit 24, a drive control circuit 26, a reproduced signal processing circuit 28, a buffer RAM 34, a buffer manager 37, an interface 38, a flash memory 39, a CPU 40, and a RAM 41. The optical disc apparatus 20 serves as an information reproducing apparatus for reproducing information recorded on the optical disc 15. It should be noted that arrows illustrated in FIG. 1 demonstrate representative flows of signals and information, and are not intended to illustrate all the connections between the blocks. The optical disc apparatus 20 is adapted to the single-side two-layer DVD-ROM and the single-side two-layer DVD-R.

The optical pickup apparatus 23 focuses laser light on a recording layer (hereinafter referred to as "target recording layer") selected from the plurality of recording layers of the optical disc 15, and receives reflected light from the target recording layer. The optical pickup apparatus 23 includes a semiconductor laser, an objective lens for condensing the light flux emitted from the semiconductor laser so as to form an optical spot on the target recording layer, a photo detector for detecting returning light reflected from the target recording layer, and a drive system (focusing actuator and tracking actuator) for driving the objective lens (not shown). The photo detector has a plurality of photo detector elements (or plurality of photo detecting areas), each of which generates a signal (photoelectric conversion signal) responsive to the amount of received light for provision to the reproduced signal processing circuit 28. The focusing actuator serves to drive the objective lens in the direction of the optical axis of the objective lens. The tracking actuator serves to drive the objective lens in a tracking direction, which is perpendicular to both the tangential direction of the track and the direction of the optical axis of the objective lens.

The seek motor 21 is a motor that drives the optical pickup apparatus 23 in the sledge direction. The seek motor 21 drives the optical pickup apparatus 23 to position an optical spot near the target position, which is referred to as a coarse seek operation or simply as coarse seek.

The reproduced signal processing circuit 28 acquires servo signals (i.e., a focus error signal, a track error signal, etc.), a RF signal, and the like based on the signals output from the photo detector (i.e., the plurality of photoelectric conversion signals) in the same manner as conventional optical disc apparatus. The servo signals obtained in this manner are supplied to the drive control circuit 26. Further, the reproduced signal processing circuit 28 performs a decoding process and error-detection process with respect to the RF signal. The reproduced signal processing circuit 28 further performs an error-correction process upon detection of an error, and supplies reproduced data to the buffer RAM 34 via the buffer manager 37. Address information contained in the reproduced data is supplied to the CPU 40.

The drive control circuit 26 generates a tracking actuator drive signal based on the track error signal supplied from the reproduced signal processing circuit 28 in order to correct the positioning error of the objective lens in the tracking direction. Further, the drive control circuit 26 generates a focusing actuator drive signal based on the focus error signal in order to correct the focusing error of the objective lens. These drive signals are supplied to the optical pickup apparatus 23. With this provision, tracking control and focus control are performed. Here, the operation that drives the tracking actuator to shift the objective lens to form an optical spot at the target position is referred to as a fine seek operation or simply as fine seek.

Moreover, the drive control circuit 26 generates a drive signal for driving the focusing actuator in response to a focus jump instruction, which orders a change in the position of the optical spot from one recording layer to the other recording layer in the direction of the optical axis of the objective lens. The drive signal generated in this manner is supplied to the optical pickup apparatus 23.

Also, the drive control circuit 26 generates a drive signal for driving the seek motor 21 and a drive signal for driving the spindle motor 22 based on instruction from the CPU 40. These drive signals are supplied to the seek motor 21 and the spindle motor 22, respectively.

The buffer RAM 34 temporarily stores the data (reproduced data) reproduced from the optical disc 15. The inputting/outputting of data into/from the buffer RAM 34 is managed by the buffer manager 37.

The laser control circuit 24 controls the power of light emission of the semiconductor laser provided in the optical pickup apparatus 23. Specifically, the laser control circuit 24 generates a semiconductor laser drive signal for provision to the optical pickup apparatus 23.

The interface 38 is a two-way communication interface to communicate with a higher-order apparatus 90 (e.g., personal computer), and complies with interface standards such as ATAPI (AT Attachment Packet Interface), SCSI (Small Computer System Interface), and USB (Universal Serial Bus).

The flash memory 39 stores therein various programs and data indicative of the light emission characteristics of the semiconductor laser. The programs include a program of the present invention written in such codes as to be decodable by the CPU 40.

The CPU 40 controls the operations of the individual parts as described above according to the programs stored in the flash memory 39. The CPU 40 also stores data and the like necessary for control in the RAM 41 and the buffer RAM 34.

In the following, a brief description will be given of a DVD-ROM, which serve as a read-only information recording medium that is commercially available today (see ECMA-267). The DVD-ROM includes a single layer disc (hereinafter referred to as a single-layer DVD-ROM) and the single-side two-layer DVD-ROM. The single-side two-layer DVD-ROM is further classified into two types according to their track paths (scan paths for reproduction). One is a parallel track path method (hereinafter referred to as a PTP method), and the other is an opposite track path method (hereinafter referred to as an OTP method).

Figure 2A:
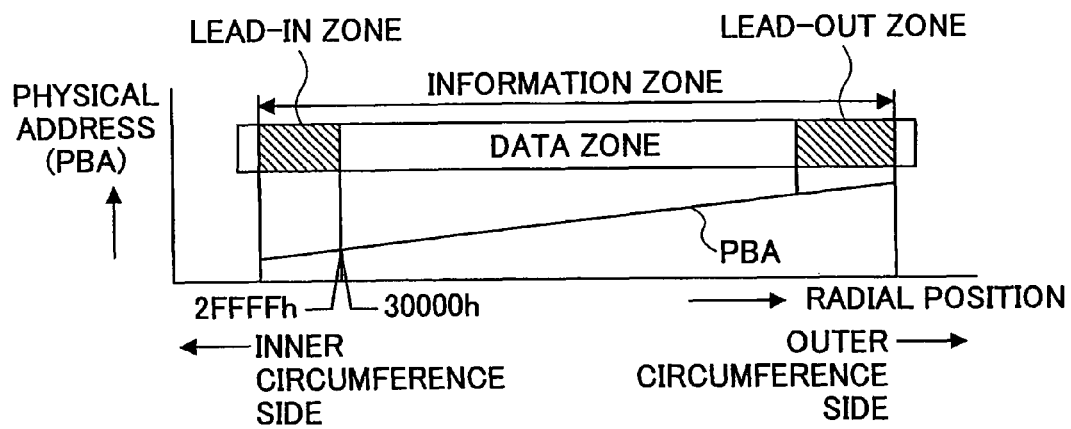
FIGS. 2A through 2C are illustrative drawings showing the layout of an information area of a DVD-ROM that is commercially available.
Figure 2B:
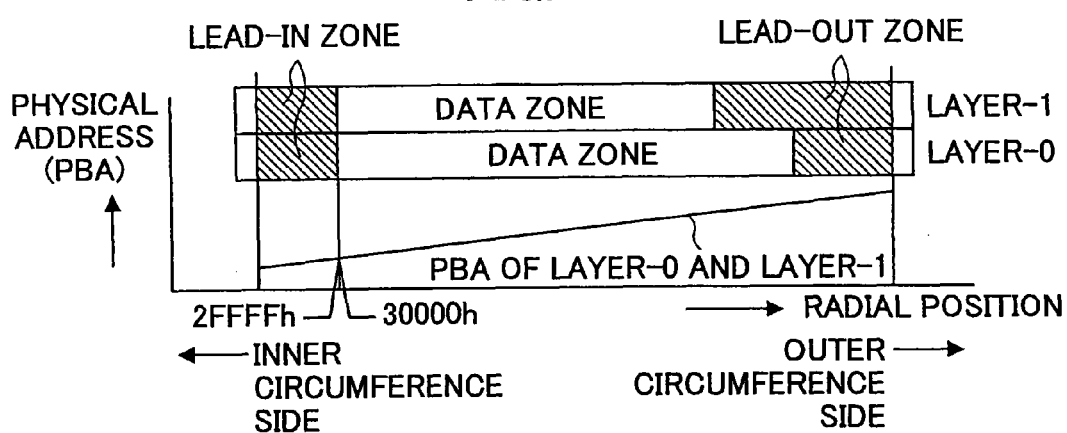
Figure 2C:
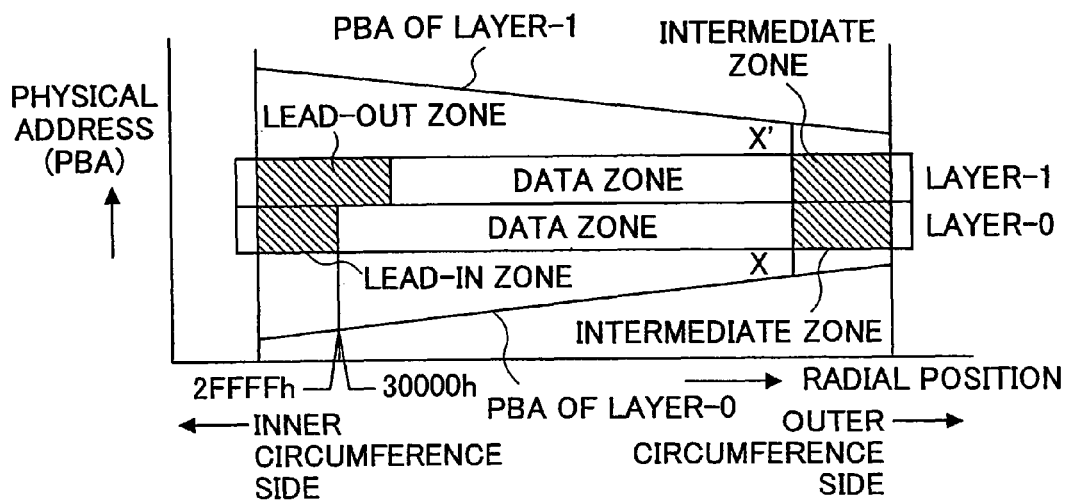

FIGS. 2A through 2C are illustrative drawings showing the layout of an information area of the DVD-ROM that is commercially available.

As shown in FIG. 2A, the single-layer DVD-ROM has an Information Area that includes a Lead-in Zone, a Data Zone, and a Lead-out Zone arranged in the order named from the inner circumference to the outer circumference in the recording layer. Consecutive physical addresses (PBA) that increase from the Lead-in Zone to the Lead-out Zone, i.e., from the disc inner circumference to the outer circumference, are assigned. In this case, the track path extends from the Lead-in Zone to the Lead-out Zone.

In the single-side two-layer DVD-ROM according to the PTP method, as shown in FIG. 2B, the Information Area divided into the Lead-in Zone, the Data Zone, and the Lead-out Zone arranged in this order from the disc inner circumference to the outer circumference is provided separately for each recording layer. Namely, the single-side two-layer DVD-ROM according to the PTP method has an Information area separately for each recording layer, which can thus be regarded as an independent recording layer independent of each other. In each recording layer, consecutive physical addresses that increase from the Lead-in Zone to the Lead-out Zone are assigned. In this case, the track path extends from the Lead-in Zone to the Lead-out Zone in each recording layer.

In the single-side two-layer DVD-ROM according to the PTP method, as shown in FIG. 2B, the start and end positions of the Lead-in Zone, the start position of the Data Zone, and the end position of the Lead-out Zone are situated at the same radial positions in each recording layer. On the other hand, the start position of the Lead-out Zone, i.e., the end position of the Data Zone, may differ from recording layer to recording layer. If the end position of the Data Zone differs in different recording layers as shown in FIG. 2B, a Lead-out is recorded in the differential portion. Here, the radial position refers to the position in the radial direction of the disc, and has a reference point at the center of disc rotation.

In the single-side two-layer DVD-ROM according to the OTP method, as shown in FIG. 2C, the layer LAYER-0 has a Lead-in Zone, a Data Zone, and an Intermediate Zone arranged in this order from the disc inner circumference to the outer circumference, and the layer LAYER-1 has an Intermediate Zone, a Data Zone, and a Lead-out Zone arranged in this order from the disc outer circumference to the inner circumference. In the layer LAYER-0, consecutive physical addresses that increase from the Lead-in Zone to the Intermediate Zone are assigned. In the layer LAYER-1, addresses having the bits thereof inverted from the physical addresses of the layer Layer-0 are assigned from the Intermediate Zone to the Lead-out Zone. Namely, in the layer LAYER-1, the physical addresses consecutively increase from the Intermediate Zone to the Lead-out Zone. In this case, the track path extends (is directed) from the Lead-in Zone to the Intermediate Zone in the layer LAYER-0, and extends (is directed) from the Intermediate Zone to the Lead-out Zone in the layer LAYER-1. Because of this, the layers LAYER-0 and LAYER-1 can be treated as a single continuous layer.

In the single-side two-layer DVD-ROM according to the OTP method, the start position of the Lead-in Zone and the end position of the Lead-out Zone, the end position of the Data Zone of the layer LAYER-0 and the start position of the Data Zone of the layer LAYER-1, and the start and end positions of the Intermediate Zone of each recording layer are situated at the same radial position. On the other hand, the start position of the Data Zone of the layer LAYER-0 and the end position of the Data Zone of the layer LAYER-1 may differ. In this case, as shown in FIG. 2C, a Lead-out is recorded in the differential portion as in the case of the single-side two-layer DVD-ROM according to the PTP method.

In the following, a description will be given of the optical disc 15 used in the present embodiment. The optical disc 15 is a two-layer disc complying with the standard of the single-side two-layer DVD+R. The single-side two-layer DVD+R is compatible with the single-side two-layer DVD+ROM according to the OTP method. In the following, a DVD+R having a single recording layer may be referred to as a "single-layer DVD+R".

Figure 3:
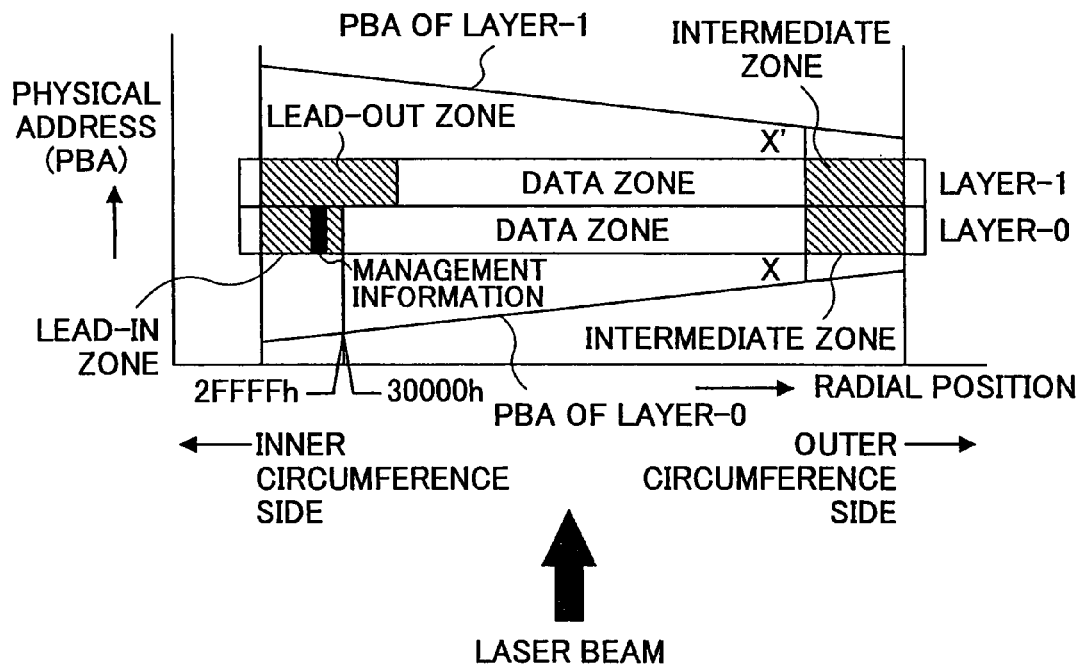
FIG. 3 is an illustrative drawing showing the configuration of an optical disc.

As shown in FIG. 3, for example, the optical disc 15 is configured such that the layer LAYER-0 has a Lead-in Zone, a Data Zone, and an Intermediate Zone arranged in this order from the disc inner circumference to the outer circumference, and the layer LAYER-1 has an Intermediate Zone, a Data Zone, and a Lead-out Zone arranged in this order from the disc outer circumference to the inner circumference. In the layer LAYER-0, consecutive physical addresses that increase from the Lead-in Zone to the Intermediate Zone are assigned. In the layer LAYER-1, addresses having the bits thereof inverted from the physical addresses of the layer Layer-0 are assigned from the Intermediate Zone to the Lead-out Zone. Namely, in the layer LAYER-1, the physical addresses consecutively increase from the Intermediate Zone to the Lead-out Zone, i.e., from the disc outer circumference to the inner circumference. The optical disc 15 is mounted in the optical disc apparatus 20 such that the layer LAYER-0 is the recording layer that is situated closer to the optical pickup apparatus 23. In this case, the track path extends (is directed) from the Lead-in Zone to the Intermediate Zone in the layer LAYER-0, and extends (is directed) from the Intermediate Zone to the Lead-out Zone in the layer LAYER-1, as in the single-side two-layer DVD+ROM according to the OTP method described above.

Figure 4A:
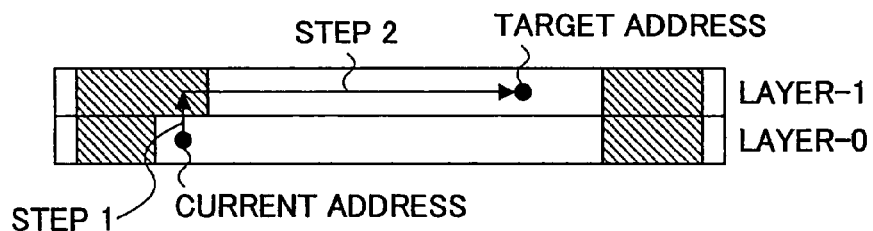
FIGS. 4A and 4B are illustrative drawings showing examples in which an optical spot is scanned from a current address in a layer LAYER-0 to a target address in a layer LAYER-1.
Figure 4B:
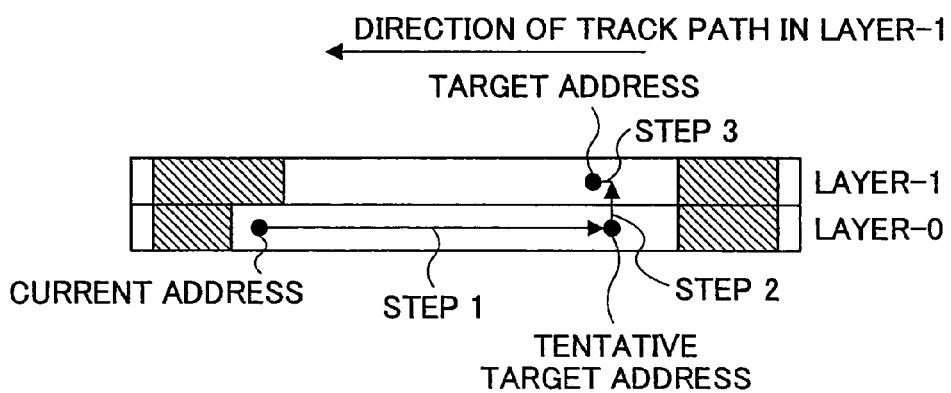

In the optical disc 15, two scan paths (first scan path and second scan path) are given as a choice of a scan path for scanning an optical spot from the current address (first address) in one recording layer (first recording layer) of the layers LAYER-0 and LAYER-1 to a target address (second address) in the other recording layer (second recording layer). In the following, a description will be given of a specific example of each scan path with respect to FIG. 4A and FIG. 4B. FIGS. 4A and 4B are illustrative drawings showing examples in which an optical spot is scanned from a current address in the layer LAYER-0 to a target address in the layer LAYER-1.

As shown in FIG. 4A serving as a non-limiting example, the first scan path as described above performs a focus jump at the current address by driving the focusing actuator, thereby changing the focus, position of the optical spot from the layer LAYER-0 to the layer LAYER-1 in the direction of the optical axis of the objective lens (step 1). Then, a seek operation toward to the target address is performed within the layer LAYER-1 (step 2). In this step 2, only a fine seek operation as previously described may be performed if the distance to be covered by the seek operation is so short that the shifting of the objective lens by the tracking actuator alone suffices. If the distance to be covered by the seek operation is so long that the shifting of the objective lens by the tracking actuator is not sufficient, a fine seek operation is performed after a coarse seek operation as previously described is performed.

As shown in FIG. 4B serving as a non-limiting example, the second scan path as described above sets a tentative target address (third address) that is situated in the layer LAYER-0 in a vicinity of the same radial position as the target address, and performs a seek operation within the layer LAYER-0 toward to the tentative target address (step 1). In this step 1, only a coarse seek operation is performed for the purpose of shortening a seek time. Then, a focus jump to the layer LAYER-1 is performed at the tentative target address (step 2). After the focus jump, a fine seek operation is performed within the layer LAYER-1 to reach the target address (step 3).

In the single-side two-layer DVD+R, a multi-track and multi-session recording method is adopted as in the case of the single-layer DVD-R (see ECMA-349, for example). In the following, a brief description will be given of a multi-session recording method with respect to the optical disc 15.

It is assumed that the recording of user data is performed with respect to the layer LAYER-0 ahead of the layer LAYER-1. Namely, according to the order of recording, the layer LAYER-0 is the first to be recorded, and the layer LAYER-1 is the second to be recorded.

Figure 5A:
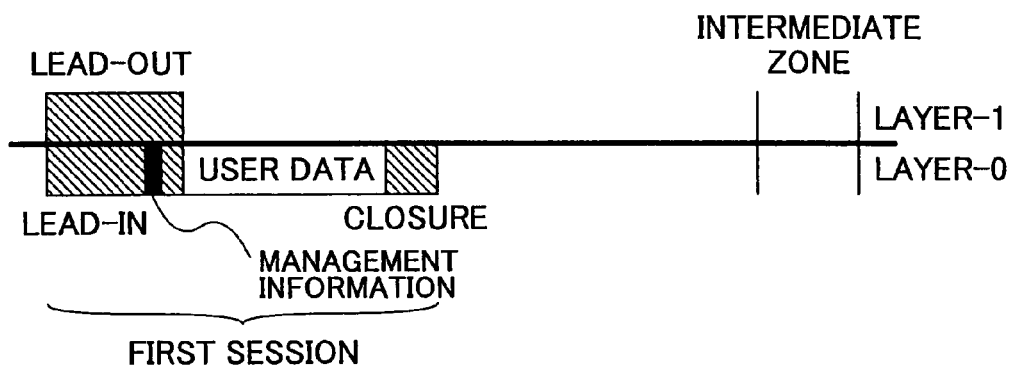
FIG. 5A is an illustrative drawing showing an example of a situation in which user data is recorded in a first session, followed by the closure of the session.

FIG. 5A is an illustrative drawing showing an example of a situation in which user data is recorded in a first session, followed by the closure of the session. The first session includes a Lead-in, user data, and a closure. Management information inclusive of information on the recording position (i.e., the start address and end address) of a fragment that exists in the first session is recorded in the management information area provided in the Lead-in Zone. Further, the Lead-out Zone of the layer LAYER-1 also stores predetermined information.

Figure 5B:
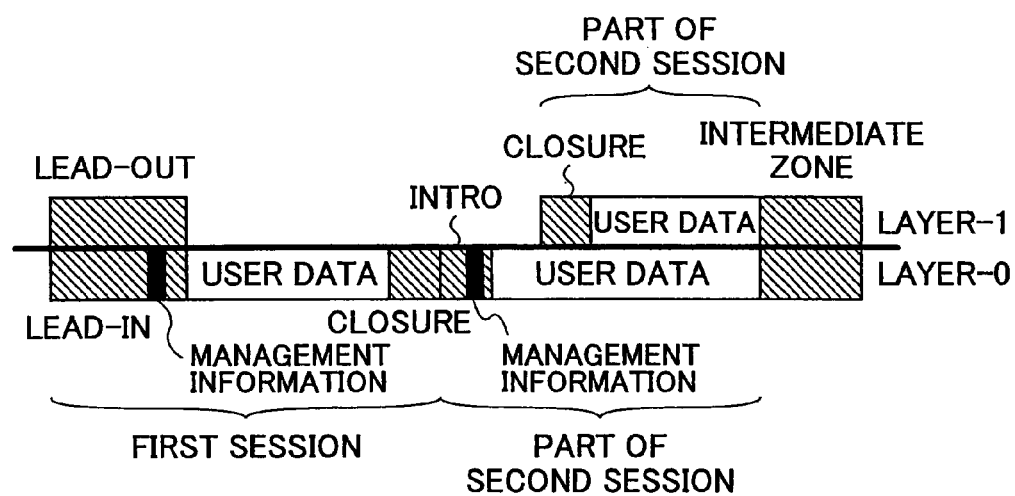
FIG. 5B is an illustrative drawing showing an example of a situation in which a second session is additionally recorded, crossing the boundary between the two recording layers LAYER-0 and LAYER-1, followed by the closure of the session.

FIG. 5B is an illustrative drawing showing an example of a situation in which a next session (second session) is additionally recorded, crossing the boundary between the two recording layers LAYER-0 and LAYER-1, followed by the closure of the session. The second session is recorded in an area immediately following the first session, and includes an Intro, user data, and a closure. In this example, the user data is recorded, crossing the boundary between the two recording layers. The Intermediate Zone of each recording layer has data stored therein indicating that the zone is an intermediate zone. Management information inclusive of information on the recording position (i.e., the start address and end address) of a fragment situated in the second session and information on the recording position (i.e., the start address and end address) of the first session is recorded in the management information area provided in the Intro of the second session.

Figure 5C:
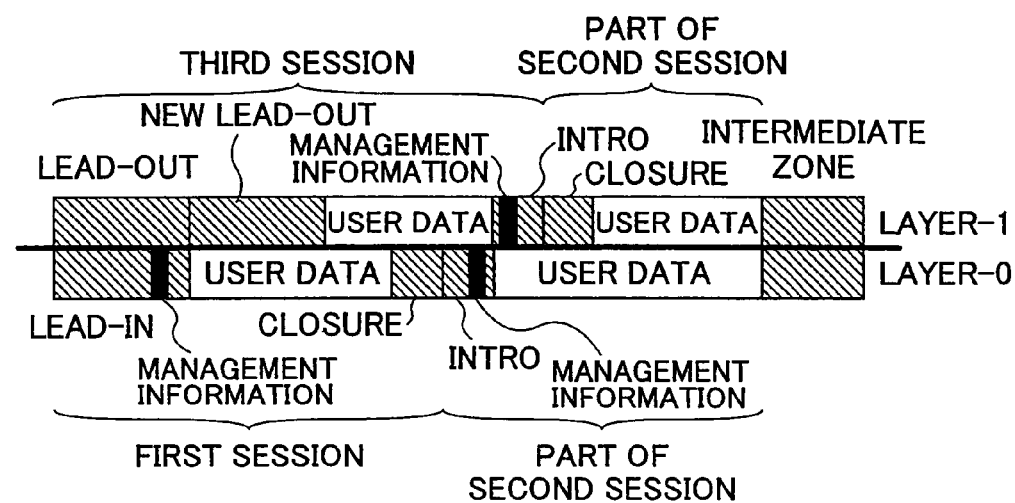
FIG. 5C is an illustrative drawing showing an example of a situation in which a third session is additionally recorded, followed by a finalizing process.

FIG. 5C is an illustrative drawing showing an example of a situation in which a next session (third session) is additionally recorded, followed by a finalizing process. The third session is recorded in an area immediately following the second session (i.e., an area closer to the inner circumference side), and includes an Intro, user data, and a Lead-out. Management information inclusive of information on the recording position (i.e., the start address and end address) of a fragment situated in the third session, information on the recording position (i.e., the start address and end address) of the second session, and information on the recording position (i.e., the start address and end address) of the first session is recorded in the management information area provided in the Intro of the third session. In an unrecorded area following the third session is recorded a new Lead-out, thereby turning all the Information Area into a prerecorded area.

Figure 6:
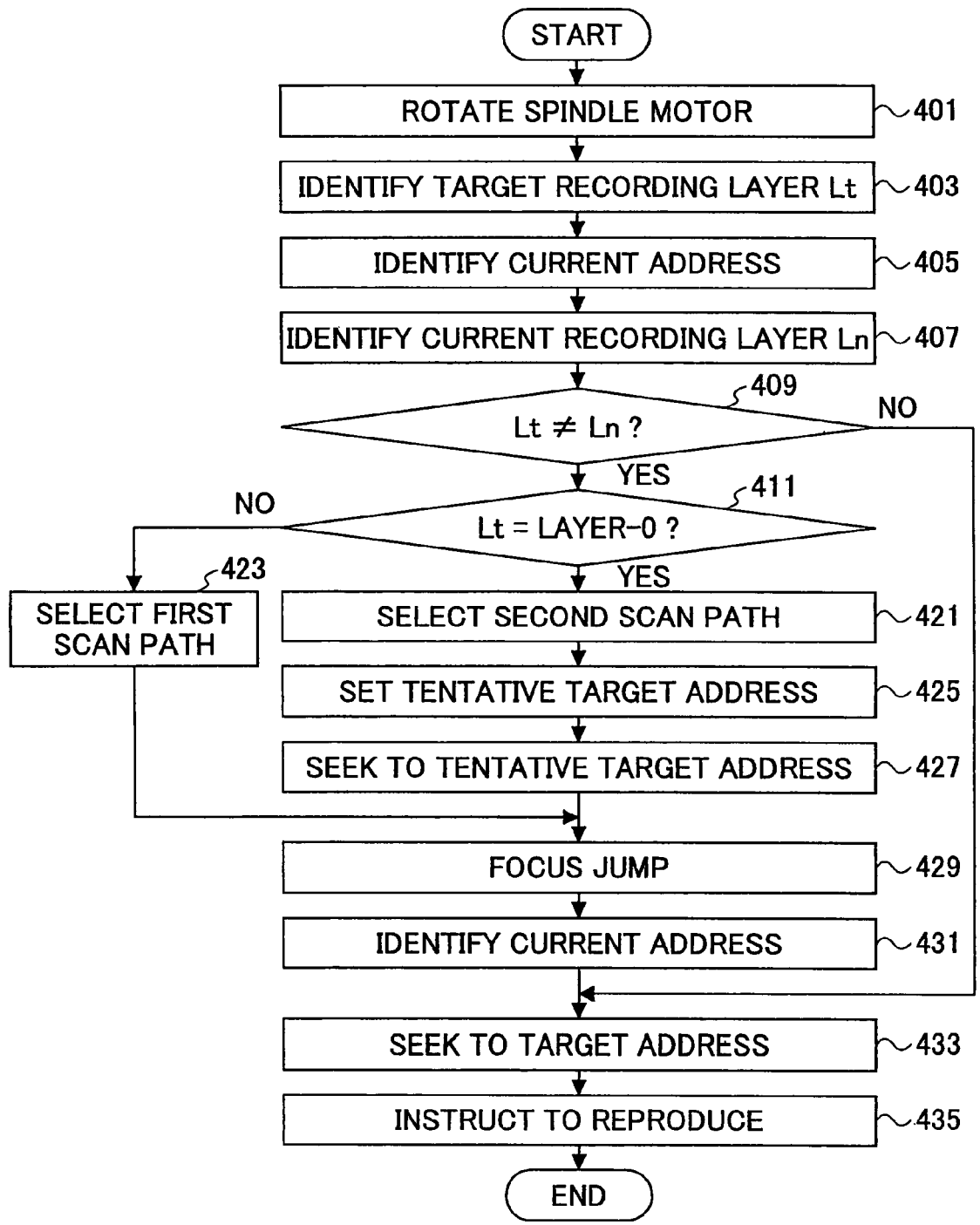
FIG. 6 is a flowchart showing an algorithm defining a series of processes performed by a CPU.

In the following, another example will be described. In this example, the optical disc 15 having a state as shown in FIG. 5B in which the second session is closed after being recorded following the first session is mounted in the optical disc apparatus 20 having the configuration as previously described, and the upper-order apparatus 90 issues a command requesting reproduction. In this case, all the Data Zone of the layer LAYER-0 is a prerecorded area, and the Data Zone of the layer Layer-1 includes an unrecorded area therein on the inner circumference side. FIG. 6 is a flowchart showing an algorithm defining a series of processes performed by the CPU 40.

In the optical disc apparatus 20, upon receiving the reproduction requesting command from the higher-order apparatus 90, the start address of a program corresponding to the flowchart of FIG. 6 stored in the flash memory 39 is set in the program counter of the CPU 40. With this, the process (reproduction process) responding to the reproduction requesting command commences.

At first step 401, an order to rotate the spindle motor 22 is given to the drive control circuit 26 based on the reproduction speed, and, also, a notice indicative of the receipt of the reproduction requesting command from the higher-order apparatus 90 is supplied to the reproduced signal processing circuit 28. When the rate of revolution of the optical disc 15 reaches a linear velocity corresponding to the reproduction speed, the tracking control and focus control as previously described are performed. The tracking control and focus control are performed as appropriate until the reproduction process comes to an end.

At next step 403, an address (target address) attached to the reproduction requesting command is extracted from the reproduction requesting command. The recording layer to which this target address belongs (hereinafter referred to as a "target recording layer Lt") is then identified.

At step 405, the address (current address) of the area in which the optical spot is currently positioned is identified based on the address information supplied from the reproduced signal processing circuit 28.

At step 407, the recording layer to which the current address belongs (hereinafter referred to as a "current recording layer Ln") is identified.

At step 409, a check is made as to whether the target recording layer Lt differs from the current recording layer Ln. If the target recording layer Lt differs from the current recording layer Ln, the check result is affirmative, so that the procedure moves to step 411.

Figure 7A:
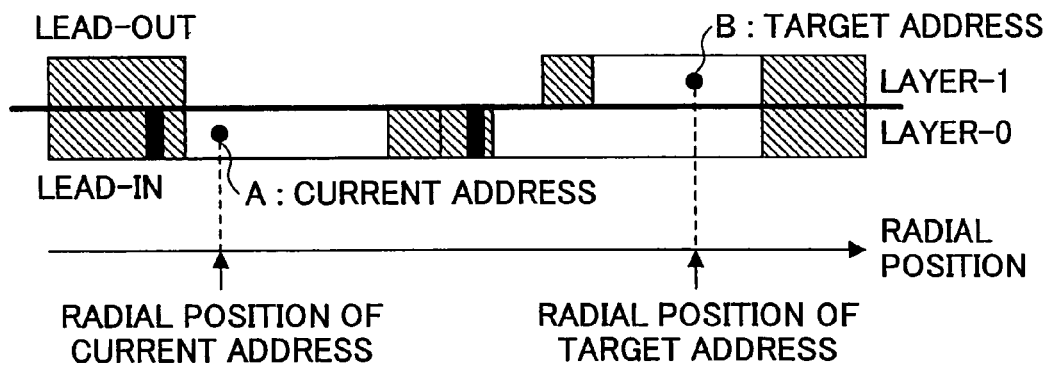
FIGS. 7A through 7C are illustrative drawings for explaining the reproduction process shown in FIG. 6.

At step 411, a check is made as to whether the current recording layer Ln is the layer LAYER-0. If the current recording layer Ln is the layer LAYER-0 as shown in FIG. 7A serving as a non-limiting example, the check result is affirmative, so that the procedure moves to step 421.

At step 421, the second scan path is selected among the first scan path and the second scan path.

Figure 7B:
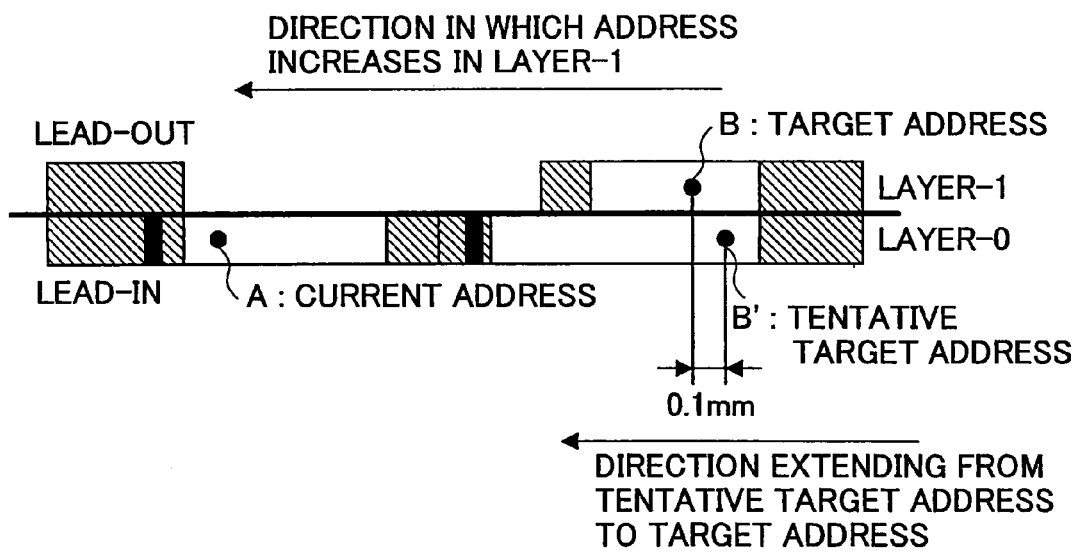

At step 425, an address in a vicinity of the same radial direction as the target address in the current recording layer Ln is set as a tentative target address. In this example, as shown in FIG. 7B serving as a non-limiting example, the direction extending from the tentative target address to the target address along the radial direction of the optical disc is the same as the direction in which the address increases in the layer LAYER-1. To be specific, the address of the position in the layer LAYER-0 that is located 0.1 mm off to the outer circumference side from the radial position of the target address is set as the tentative target address.

In general, optical discs having a plurality of recording layers are manufactured by gluing the individual recording layers together after they are separately produced. When the individual recording layers are glued together, the relative positions of the individual recording layers may deviate from the designed positions. Even if such deviation is within a tolerable range, there may be a recording layer in which the actual radial position on the optical disc may not match the radial position obtained of the address due to the deviation. Even when the tentative target address is set to the same radial position as the target address, thus, the address after a focus jump may end up being different from the target address. Especially when the target address is close to an unrecorded area, there is a risk of accessing the unrecorded area upon the focus jump. In the present embodiment, therefore, the direction extending from the tentative target address to the target address along the radial direction of the optical disc is set in the same direction as the direction in which the address increases in the target recording layer. When the address increases from the outer circumference to the inner circumference in the target recording layer, for example, the tentative target address is positioned nearer to the outer circumference than the radial position of the target address. Conversely, when the address increases from the inner circumference to the outer circumference in the target recording layer (as in the case of a PTP-method optical disc, for example), the tentative target address is positioned closer to the inner circumference than the radial position of the target address. With this provision, it is possible to avoid accessing an unrecorded area upon a focus jump even when the target address is closely situated to the unrecorded area.

At step 427, the drive control circuit 26 is instructed to perform a coarse seek operation toward the tentative target address.

At step 429, the drive control circuit 26 is instructed to perform a focus jump to the layer LAYER-1 when the confirmation is made based on the address information from the reproduced signal processing circuit 28 that the coarse seek operation to the tentative target address is completed.

At step 431, the address of the area in which the optical spot is currently positioned is identified based on the address information supplied from the reproduced signal processing circuit 28.

Figure 7C:
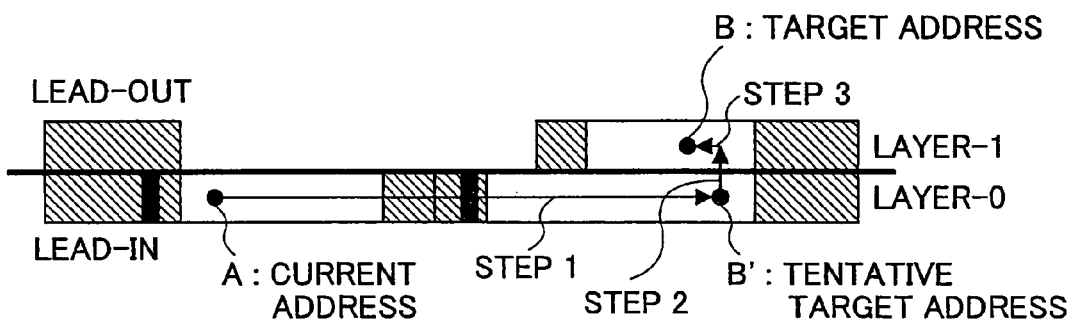

At step 433, the drive control circuit 26 is ordered to perform a fine seek operation to the target address. When the target recording layer Lt differs from the current recording layer Ln, and when the current recording layer Ln is the layer LAYER-0, as shown in FIG. 7C serving as a non-limiting example, the second scan path is selected to arrive at the target address by performing (1) a coarse seek operation to the tentative target address (STEP 1), (2) a focus jump (STEP 2), and (3) a fine seek operation to the target address (STEP 3).

At step 435, the reproduced signal processing circuit 28 is instructed to perform a read operation when the confirmation is made based on the address information from the reproduced signal processing circuit 28 that the seek to the target address is completed. In response, the reproduced signal processing circuit 28 produces reproduced data, which is then stored in the buffer RAM 34. The reproduced data is transferred to the higher-order apparatus 90 via the buffer manager 37 and the interface 38 by increments of one sector. When the reproduction of all the data specified by the higher-order apparatus 90 is completed, the reproduction process comes to an end after performing a predetermined finishing process.

Figure 8A:
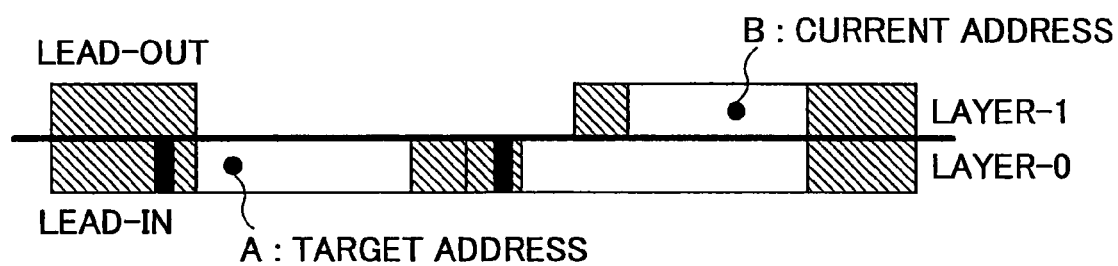
FIGS. 8A and 8B are illustrative drawings for explaining the reproduction process shown in FIG. 6.
Figure 8B:
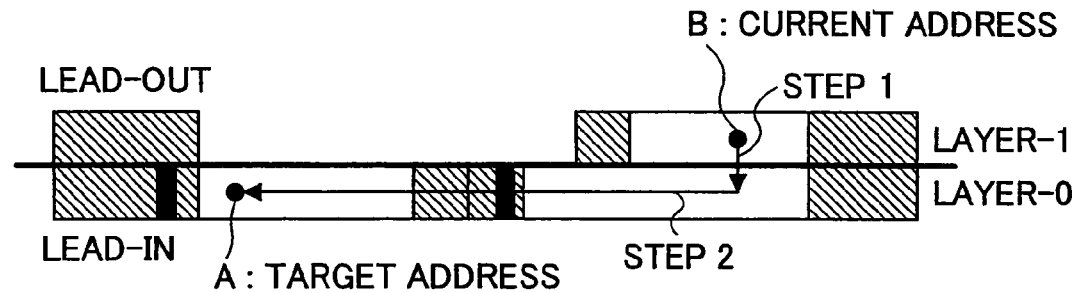

If the target recording layer Lt is the layer LAYER-0 as shown in FIG. 8A serving as a non-limiting example, and the current recording layer Ln is the layer LAYER-1, the result of the check at step 411 is negative, so that the procedure proceeds to step 423. At step 423, the first scan path is selected among the first scan path and the second scan path. The procedure then proceeds to step 429. At step 429, a focus jump to the layer LAYER-1 is performed at the current address. At step 433, the drive control circuit 26 is instructed to perform a seek operation from the focus jump position to the target address. In doing so, only a fine seek operation may be performed if the distance from the focus jump position to the target address is so short that the shifting of the objective lens by the tracking actuator alone suffices. If the distance to be covered by the seek operation is so long that the shifting of the objective lens by the tracking actuator is not sufficient, a fine seek operation is performed after a coarse seek operation is performed. In this manner, as shown in FIG. 8B serving as a non-limiting example, when the target recording layer Lt is different from the current recording layer Ln, and the current recording layer Ln is the layer LAYER-1, the first scan path is selected to arrive at the target address by performing (1) a focus jump (STEP 1) and (2) a seek operation to the target address (STEP 2).

If the target recording layer Lt is the same as the current recording layer Ln at step 409, the result of the check at step 409 is negative, so that the procedure proceeds to step 433. At step 433, a seek operation from the current address to the target address is performed. In doing so, only a fine seek operation may be performed if the distance from the current address to the target address is so short that the shifting of the objective lens by the tracking actuator alone suffices. If the distance to be covered by the seek operation is so long that the shifting of the objective lens by the tracking actuator is not sufficient, a fine seek operation is performed after a coarse seek operation is performed.

As is understood from the above description, a control apparatus in the optical disc apparatus 20 of the present embodiment is implemented by use of the CPU 40 and the program performed by the CPU 40. Namely, the control apparatus is implemented based on the steps 403 through 433 shown in FIG. 6. At least part of the control apparatus implemented based on the program-based processing by the CPU 40 may be implemented by use of hardware. Further, a processing apparatus is implemented by use of the reproduced signal processing circuit 28.

In the present embodiment, the program of the present invention is implemented by use of the reproduction processing program described above, which is one of the programs stored in the flash memory 39 serving as a memory medium. Namely, the selection procedure is achieved by the program corresponding to the processes of steps 411 through 423 shown in FIG. 6.

Based on the processes of steps 411 through 423 of FIG. 6, the selecting process in the reproduction method according to the present invention is implemented.

According to the optical disc apparatus 20 of the present embodiment as described above, the optical disc 15 that has two recording layers LAYER- 0 and LAYER-1 with a prerecorded area and an unrecorded area being coexistent is mounted. Upon the reception of a reproduction requesting command issued from the higher-order apparatus 90, the current address (first address) in the current recording layer Ln (first recording layer) is used as a starting position in order to detect the position of reproduction responsive to the reproduction requesting command. The optical spot needs to be scanned from the starting point to the target address (second address) in the target recording layer Lt (second recording layer), which is the address at which reproduction is supposed to take place. If the target recording layer Lt is different from the current recording layer Ln, and the current recording layer Ln is the layer LAYER-0, the second scan path is selected. If the target recording layer Lt is different from the current recording layer Ln, and the current recording layer Ln is the layer LAYER-1, the first scan path is selected. With this provision, the optical spot is scanned to the target address along a prerecorded area in at least one of the recording layers LAYER-0 and LAYER-1. This makes it possible to obtain address information necessary for the scan with sufficient accuracy as the scan proceeds. As a result, the optical spot can be formed accurately at the target address. That is, information recorded on an optical disc having a plurality of recording layers with an unrecorded area and prerecorded area being coexistent is properly reproduced in a stable manner.

According to the present embodiment, when the second scan path is selected, a tentative target address is set to the position in the layer LAYER-0 that is situated 0.1 mm off to the outer circumference side from the radial position of the target address. With this provision, it is possible to avoid accessing an unrecorded area upon a focus jump even if the target address is closely situated to the unrecorded area. As a result, information recorded on the optical disc 15 can be reproduced properly in a stable manner. Needless to say, the amount of the shift is not limited to 0.1 mm. For example, the amount of the shift may be set within a range that can be covered by a fine seek operation.

[Variation of Reproduction Process]

Figure 9:
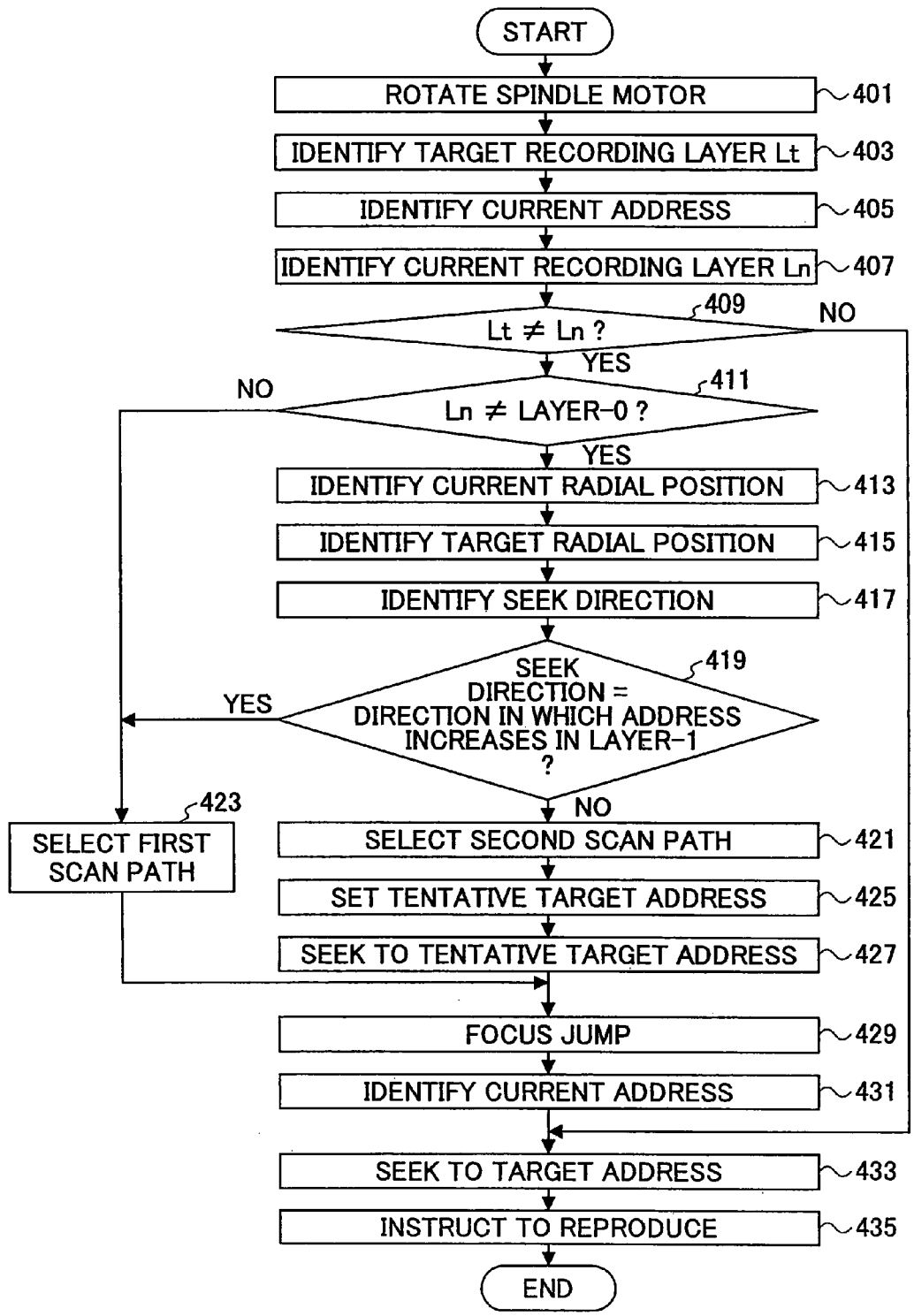
FIG. 9 is a flowchart for explaining a variation of the reproduction process performed by the optical disc apparatus of FIG. 1.
Figure 10A:
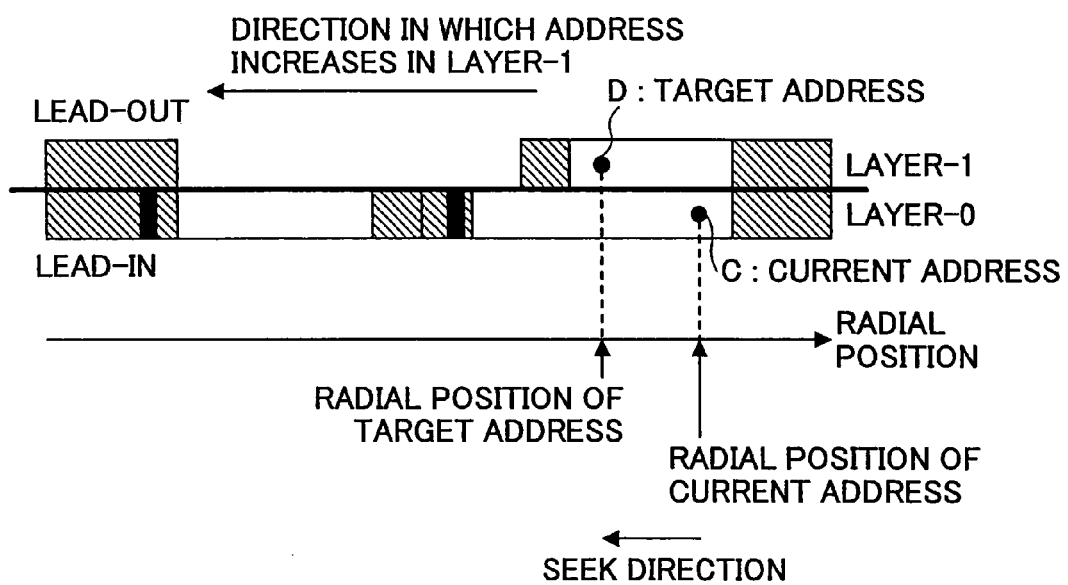
FIGS. 10A and 10B are illustrative drawings for explaining the reproduction process shown in FIG. 9.
Figure 10B:
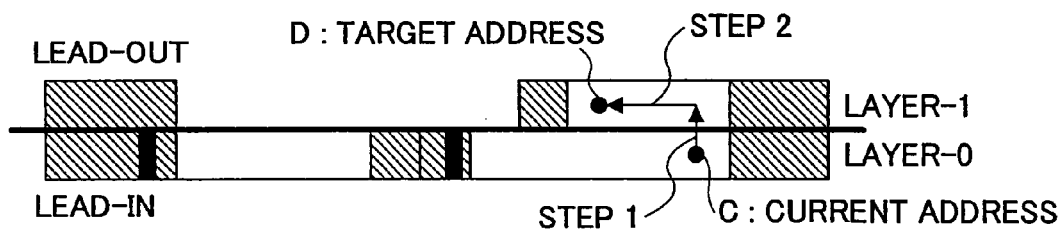

In the embodiment described above, the second scan path is selected in the reproduction process if the target recording layer Lt is different from the current recording layer Ln and if the current recording layer Ln is the layer LAYER-0. As a variation of the reproduction process, when the target recording layer Lt is different from the current recording layer Ln, and the current recording layer Ln is the layer LAYER-0, the first scan path may be selected properly if the direction extending from the current address to the target address along the radial direction of the disc is the same as the direction in which the address increases in the target recording layer Lt. This is shown in FIG. 9 through FIG. 10B. This provision can shorten the scan time. FIG. 9 is a flowchart for explaining this variation. In FIG. 9, steps 413 through 419 are inserted between steps 411 and 421 shown in the flowchart of FIG. 6. In the flowchart of FIG. 9, the steps having the same step numbers as those of the flowchart of FIG. 6 perform the same processes as previously described. In the following, a description will be given of inserted steps 413 through 419.

Figure 11A:
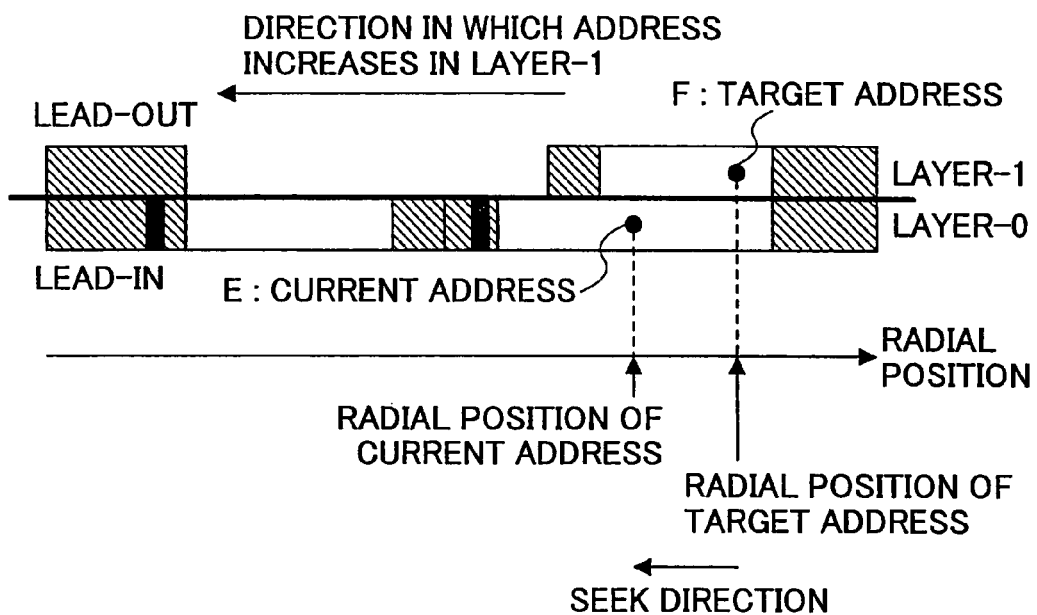
FIGS. 11A and 11B are illustrative drawings for explaining the reproduction process shown in FIG. 9.

At step 413, the radial position of the current address is obtained. At step 415, the radial position of the target address is obtained. At step 417, the direction extending from the current address to the target address along the radial direction of the disc is identified as a seek direction based on the radial position of the current address and the radial direction of the target address. As shown in FIG. 10A, if the radial position of the target address (address D in this example) is situated closer to the inner circumference than the radial position of the current address (address C in this example), the seek direction extends from the disc outer circumference to the inner circumference. On the other hand, as shown in FIG. 11A, if the radial position of the target address (address F in this example) is situated closer to the outer circumference than the radial position of the current address (address E in this example), the seek direction extends from the disc inner circumference to the outer circumference.

At step 419, a check is made as to whether the seek direction is the same as the direction in which the address increases in the layer LAYER-1. As shown in FIG. 10A, if the seek direction extends from the disc outer circumference to the inner circumference, the result of the check is affirmative, so that the procedure proceeds to step 423. As shown in FIG. 11A, on the other hand, if the seek direction extends from the disc inner circumference to the outer circumference, the result of the check is negative, and the procedure proceeds to step 421.

Namely, if the target recording layer Lt is different from the current recording layer Ln, and the current recording layer Ln is the layer LAYER-0, with the seek direction extending in the direction in which the address increases in the layer LAYER-1, the first scan path is selected as shown in FIG. 10B serving as a non-limiting example. That is, the target address is reached by performing (1) a focus jump (STEP 1) and (2) a seek operation to the target address (STEP 2).

Figure 11B:
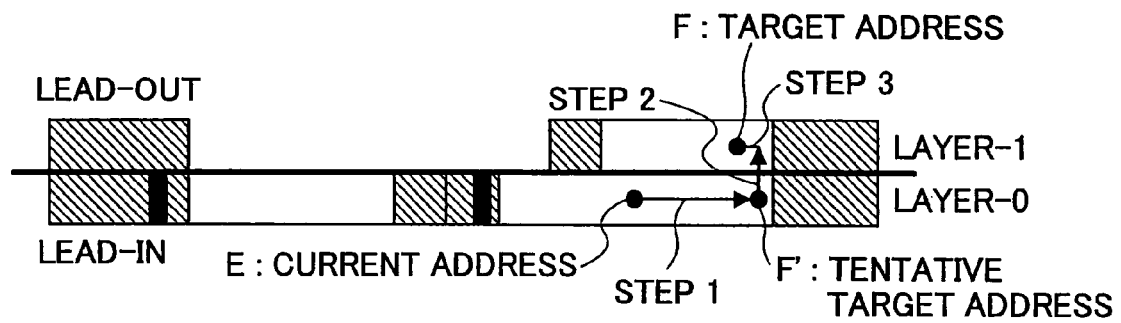
Figure 12A:
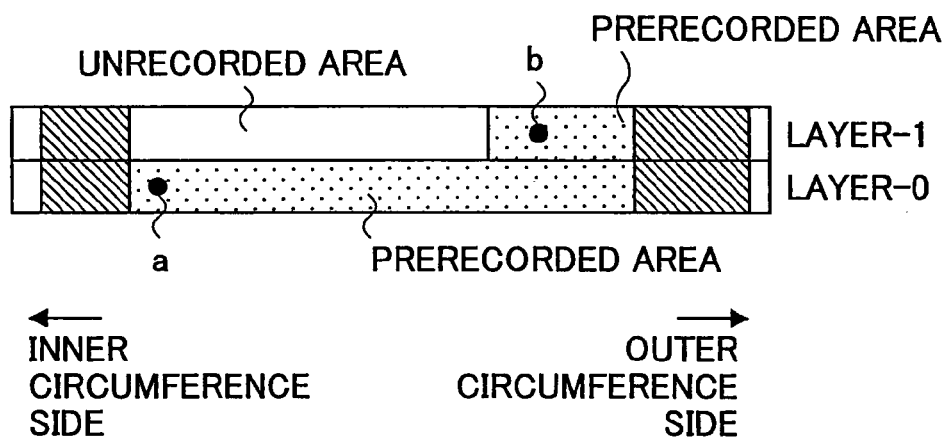
FIGS. 12A through 12C are illustrative drawings for explaining an access error occurring in a related-art disc drive apparatus.
Figure 12B:
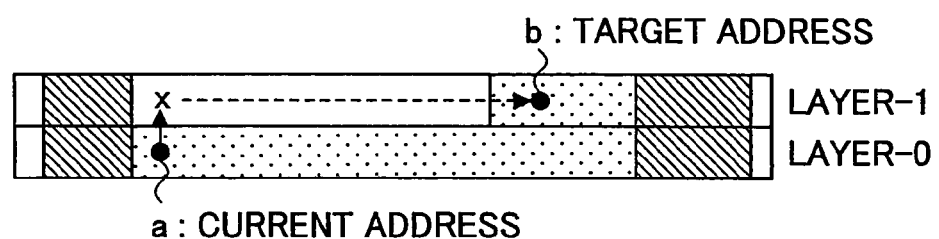
Figure 12C:
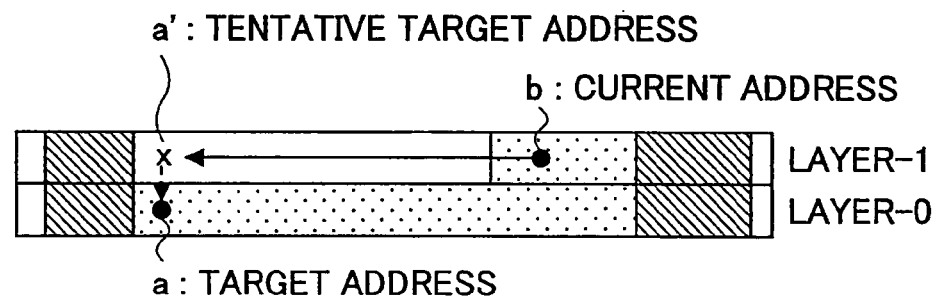

If the target recording layer Lt is different from the current recording layer Ln, and the current recording layer Ln is the layer LAYER-0, with the seek direction extending opposite to the direction in which the address increases in the layer LAYER-1, the second scan path is selected as shown in FIG. 11B serving as a non-limiting example. That is, the target address is reached by performing (1) a coarse seek operation to the tentative target address (address F' in this example) (STEP 1), (2) a focus jump (STEP 2), and (3) a fine seek operation to the target address (STEP 3).

In the reproduction process, the program corresponding to the flowchart of FIG. 9 may be performed by the CPU 40 in place of the program corresponding to the flowchart of FIG. 6. This can bring about the same advantages as the embodiment described above. In this case, the control apparatus is implemented based on steps 403 through 433 of FIG. 9. The selection procedure in the program of the present invention is implemented by use of the program corresponding to the processes of steps 411 through 423 of FIG. 9. Further, the processes of steps 411 through 423 shown in FIG. 9 achieve the selection process in the reproduction method of the present invention.

In the embodiment and variation described above, a description has been given of a case in which upon the selection of the second scan path, the tentative target address is set at a position in the layer LAYER-0 that is displaced toward the outer circumference side from the radial position of the target address. If there is little risk of accessing an unrecorded area upon a focus jump, for example, there may be no need to displace the tentative target address purposefully.

In the embodiment and variation described above, a description has been given of a case in which upon the selection of the second scan path, a coarse seek operation from the start point to the tentative target address is performed. If the seek distance from the start point to the tentative target address is short, so that the shifting of the objective lens by the tracking actuator is sufficient, the coarse seek operation to the tentative target address may properly be omitted.

In the embodiment and variation described above, a description has been given of a case in which upon the selection of the second scan path, a fine seek operation is performed to reach the target address after the focus jump. If the seek distance from the focus jump point to the target address is long, so that the shifting of the objective lens by the tracking actuator is not sufficient, a coarse seek operation may be performed prior to the fine seek operation.

In the embodiment and variation described above, a description has been given of a case in which the optical disc conforms to the single-side two-layer DVD+R standard. This is only a non-limiting example, and the present invention is applicable to the next-generation single-side two-layer disc that is adapted to light having a wavelength of approximately 405 nm, for example.

In the embodiment and variation described above, a description has been given of a case in which recording on an optical disc is performed according to the OTP method. This is not a limiting example, and the present invention is applicable to the PTP method as well.

In the embodiment and variation described above, a description has been given of a case in which the optical disc has two recording layers. This is not a limiting example, and the present invention is applicable to an optical disc having three or more recording layers.

In the embodiment and variation described above, a description has been given of a case in which the program of the present invention is stored in the flash memory 39. The program may alternatively be stored in other recording medium such as a CD, magneto-optical disc, DVD, memory card, USB memory, flexible disc, etc. In such a case, the program of the present invention is loaded to the flash memory 39 by use of a reproducing apparatus (or dedicated interface) adapted to such recording medium. Alternatively, the program of the present invention may be transferred to the flash memory 39 via a network such as a LAN, intranet, the Internet, etc. In other words, it suffices if the program of the present invention is loaded to the flash memory 39 in one way or another.

In the embodiment and variation described above, a description has been given of a case in which the optical pickup apparatus is provided with a single semiconductor laser. This is not a limiting example, and the present invention may be applicable to a configuration in which a plurality of semiconductor lasers emit optical beams having different wavelengths. In such a case, this configuration may include at least one of the semiconductor laser emitting an optical beam having a wavelength of approximately 405 nm, the semiconductor laser emitting an optical beam having a wavelength of approximately 660 nm, and the semiconductor laser emitting an optical beam having a wavelength of approximately 780 nm. In other words, the optical disc apparatus may be adapted to a plurality of types of optical discs conforming to different standards. In this case, at least one of the optical discs may be an optical disc having a plurality of recording layers.

As described above, the reproduction method according to the present invention may be suited for a proper and stable reproduction of information recorded on an optical disc that has a plurality of recording layers with an unrecorded area and a recorded area being coexistent. Further, the optical disc apparatus according to the present invention may be suited for a proper and stable reproduction of information recorded on an optical disc that has a plurality of recording layers with an unrecorded area and a recorded area being coexistent. Moreover, the program and recording medium according to the present invention the reproduction method according to the present invention may be suited for a proper and stable reproduction of information recorded on an optical disc that has a plurality of recording layers with an unrecorded area and a recorded area being coexistent.

Although the present invention has been described with reference to embodiments, the present invention is not limited to these embodiments, but various variations and modifications may be made without departing from the scope of the invention as set forth in the accompanying claims.

The present application is based on Japanese priority application No. 2004-302568 filed on Oct. 18, 2004, with the Japanese Patent Office, the entire contents of which are hereby incorporated by reference.

The invention claimed is:

1. A method of reproducing information recorded on an optical disc having a plurality of recording layers inclusive of a first recording layer and a second recording layer, comprising the steps of:
    referring, by use of a control-purpose computer, to an order of recording of the first recording layer and the second recording layer according to which information is recorded in a prerecorded area of the optical disc; and
    selecting, by use of a control-purpose computer, a scan path based on the order of recording, from a first scan path including no seek operation preceding a focus jump and a second scan path including a seek operation preceding a focus jump, to scan an optical spot from a first address in the first recording layer to a second address in the second recording layer through scanning along the prerecorded area in at least one of the first recording layer and the second recording layer, the second address being a target address where reproduction is to be performed.

2. The method as claimed in claim 1, wherein the first scan path includes:
    a focus jump from the first recording layer to the second recording layer at the first address; and
    a seek operation to the second address within the second recording layer following the focus jump,
    and the second scan path includes:
    a seek operation within the first recording layer from the first address to a third address that is situated in the first recording layer in a vicinity of the second address in terms of the radial direction of the optical disc;
    a focus jump from the first recording layer to the second recording layer at the third address; and
    a seek operation to the second address within the second recording layer following the focus jump.

3. The method as claimed in claim 2, wherein in the second scan path, a direction extending from the third address to the second address in terms of the radial direction of the optical disc is a direction in which an address increases in the second recording layer.

4. The method as claimed in claim 1, wherein the step of selecting selects the first scan path if the second recording layer is ahead of the first recording layer in the order of recording.

5. The method as claimed in claim 1, wherein the step of selecting selects the second scan path if the first recording layer is ahead of the second recording layer in the order of recording.

6. The method as claimed in claim 1, wherein the step of selecting selects the first scan path if the first recording layer is ahead of the second recording layer in the order of recording and if a direction extending from the first address to the second address in terms of the radial direction of the optical disc is a direction in which an address increases in the second recording layer.

7. The method as claimed in claim 1, wherein the step of selecting selects the second scan path if the first recording layer is ahead of the second recording layer in the order of recording and if a direction extending from the first address to the second address in terms of the radial direction of the optical disc is opposite to a direction in which an address increases in the second recording layer.

8. An optical disc apparatus for reproducing information recorded on an optical disc having a plurality of recording layers inclusive of a first recording layer and a second recording layer, comprising:
an optical pickup unit configured to form an optical spot on a recording layer selected from the plurality of recording layers and to detect light reflected from the selected recording layer;
a control unit configured to control said optical pickup unit such that an order of recording of the first recording layer and the second recording layer according to which information is recorded in a prerecorded area of the optical disc is referred to, and that a scan path is selected based on the order of recording, from a first scan path including no seek operation preceding a focus jump and a second scan path including a seek operation preceding a focus jump, to scan the optical spot from a first address in the first recording layer to a second address in the second recording layer through scanning along the prerecorded area in at least one of the first recording layer and the second recording layer, the second address being a target address where reproduction is to be performed; and
a processing unit configured to reproduce information by use of a signal output from said optical pickup unit.

9. The optical disc apparatus as claimed in claim 8, wherein the first scan path includes:
a focus jump from the first recording layer to the second recording layer at the first address; and
a seek operation to the second address within the second recording layer following the focus jump,
and the second scan path includes:
a seek operation within the first recording layer from the first address to a third address that is situated in the first recording layer in a vicinity of the second address in terms of the radial direction of the optical disc;
a focus jump from the first recording layer to the second recording layer at the third address; and
a seek operation to the second address within the second recording layer following the focus jump.

10. The optical disc apparatus as claimed in claim 9, wherein in the second scan path, a direction extending from the third address to the second address in terms of the radial direction of the optical disc is a direction in which an address increases in the second recording layer.

11. The optical disc apparatus as claimed in claim 8, wherein said control unit selects the first scan path if the second recording layer is ahead of the first recording layer in the order of recording.

12. The optical disc apparatus as claimed in claim 8, wherein said control unit selects the second scan path if the first recording layer is ahead of the second recording layer in the order of recording.

13. The optical disc apparatus as claimed in claim 8, wherein said control unit selects the first scan path if the first recording layer is ahead of the second recording layer in the order of recording and if a direction extending from the first address to the second address in terms of the radial direction of the optical disc is a direction in which an address increases in the second recording layer.

14. The optical disc apparatus as claimed in claim 8, wherein said control unit selects the second scan path if the first recording layer is ahead of the second recording layer in the order of recording and if a direction extending from the first address to the second address in terms of the radial direction of the optical disc is opposite to a direction in which an address increases in the second recording layer.

15. A non-transitory computer-readable recording medium with a program for causing a control-purpose computer in an optical disc apparatus to reproduce information recorded on an optical disc having a plurality of recording layers inclusive of a first recording layer and a second recording layer embedded thereon, the program comprising program codes to cause the control-purpose computer to perform the steps of:
referring to an order of recording of the first recording layer and the second recording layer according to which information is recorded in a prerecorded area of the optical disc; and
selecting a scan path based on the order of recording, from a first scan path including no seek operation preceding a focus jump and a second scan path including a seek operation preceding a focus jump, to scan an optical spot from a first address in the first recording layer to a second address in the second recording layer through scanning along the prerecorded area in at least one of the first recording layer and the second recording layer, the second address being a target address where reproduction is to be performed.

16. The non-transitory computer-readable recording medium as claimed in claim 15, wherein the first scan path includes:
a focus jump from the first recording layer to the second recording layer at the first address; and
a seek operation to the second address within the second recording layer following the focus jump,
and the second scan path includes:
a seek operation within the first recording layer from the first address to a third address that is situated in the first recording layer in a vicinity of the second address in terms of the radial direction of the optical disc;
a focus jump from the first recording layer to the second recording layer at the third address; and
a seek operation to the second address within the second recording layer following the focus jump.

17. The non-transitory computer-readable recording medium as claimed in claim 16, wherein in the second scan path, a direction extending from the third address to the second address in terms of the radial direction of the optical disc is a direction in which an address increases in the second recording layer.

18. The non-transitory computer-readable recording medium as claimed in claim 15, wherein the step of selecting selects the first scan path if the second recording layer is ahead of the first recording layer in the order of recording.

19. The non-transitory computer-readable recording medium as claimed in claim 15, wherein the step of selecting selects the second scan path if the first recording layer is ahead of the second recording layer in the order of recording.

20. The non-transitory computer-readable recording medium as claimed in claim 15, wherein the step of selecting selects the first scan path if the first recording layer is ahead of the second recording layer in the order of recording and if a direction extending from the first address to the second address in terms of the radial direction of the optical disc is a direction in which an address increases in the second recording layer.

21. The non-transitory computer-readable recording medium as claimed in claim 15, wherein the step of selecting selects the second scan path if the first recording layer is ahead of the second recording layer in the order of recording and if a direction extending from the first address to the second address in terms of the radial direction of the optical disc is opposite to a direction in which an address increases in the second recording layer.

* * * * *